July 10, 1928.
H. W. McCANDLESS
STANCHION
Filed Dec. 9, 1927
1,676,568
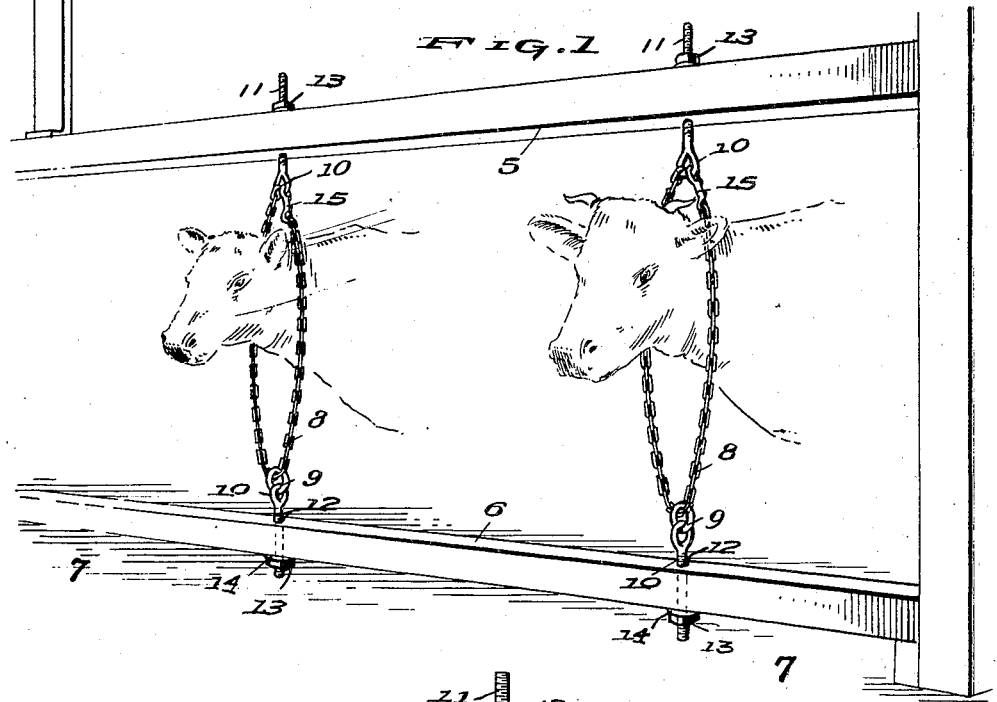
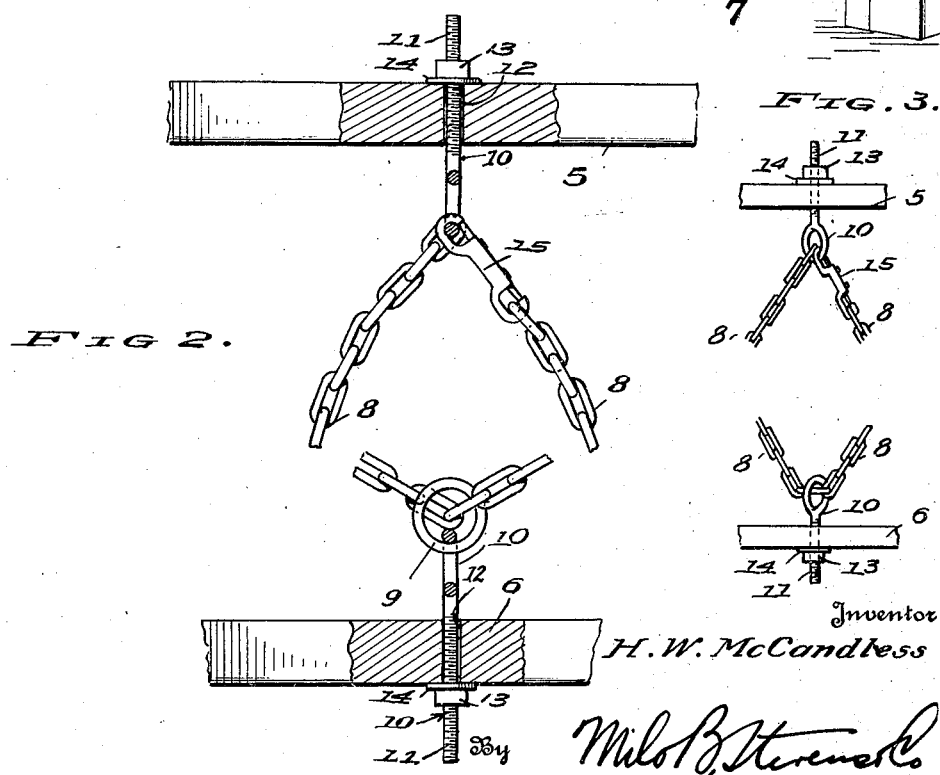
Inventor
H. W. McCandless
By Milo B. Stevens
Attorney Patented July 10, 1928.

1,676,568

UNITED STATES PATENT OFFICE.

HENRY W. McCANDLESS, OF NEW ALBANY, INDIANA.

STANCHION.

Application filed December 9, 1927. Serial No. 238,930.

My invention relates to stanchions such as are used in barns and stables for tying up cattle,—particularly cows.

Briefly stated, my invention has for its primary object to provide a device of this character which will be very simple, durable and inexpensive of construction, convenient to use and install, and which will give the animal much more freedom of movement than do other devices of its class.

Another object of the invention is to furnish a stanchion which is capable of adjustment to cattle of different sizes without inconvenience or loss of time.

The foregoing and other objects of the invention are attained by means of a novel combination and arrangement of parts to be hereinafter described and claimed, and in order that the same may be better understood, reference is had to the accompanying drawing which illustrates the now preferred embodiment of the invention. It is to be understood, of course, that the invention is capable of various slight changes and modifications within the spirit and scope of the subject matter claimed.

In the drawing, wherein the same reference characters have been used to designate the same parts in all views, Figure 1 is a perspective view of a stanchion layout as contemplated by this invention;

Figure 2 is a fragmentary elevational view partly broken and partly in section, and Figure 3 is a perspective view of a modification.

Referring specifically to the drawing, numerals 5 and 6 denote, respectively, upper and lower horizontal beams spaced about thirty-nine inches apart and located rearwardly of the mangers 7. These beams are designed, as shown, to support a plurality of stanchions, and inasmuch as the latter are identical a description of one will suffice for all.

Each stanchion comprehends a chain 8 which is threaded through a ring 9 carried by the eye of an eyebolt 10. The ends of chain 8 are secured to the eye of a second eyebolt 10. The shanks 11 of the eyebolts 10 extend loosely through holes 12 in the respective beams 5, 6. The length of the shanks 11 is considerable and this permits the eyebolts to be adjusted toward or away from each other to create or take up slack in the chain 8 in an obvious manner so that the same may be made to accommodate the neck of a cow of predetermined size.

Nuts 13 threaded on the eyebolt shanks 11 and disposed outwardly of washers 14 thereon bearing against the outer faces of the beams 5, 6 constitute the means for adjusting the bolt shanks 11 as aforesaid. The shanks 11 are freely rotatable in their holes 12 and this coupled with the inherent flexibility of the chains 8 enables the animal to swing its head around about as it pleases whether in a standing or reclining position.

One end of the chain 8 has a snap hook 15 to engage one of the eyes of upper eyebolt 10 whereby to removably confine the animal's head in the stanchion.

While one chain 8 has been described, yet it will be obvious that two chains could be used with their ends connected to the eyebolts 10.

Figure 3 shows a modified form of the invention wherein the chain is threaded directly through the eye of an eyebolt 9$^a$.

The lower beam 6 is preferably supported about three inches above the floor upon blocks or the like and is securely nailed down. The upper beam 5 may be suitably supported in any fashion so as to give it rigidity sufficient to serve the purpose for which it is designed. Where the upper beam is particularly long the same is preferably supported intermediate its ends by means of brackets or hangers suspended from a suitable support above,—as for instance a rafter.

Having thus described my invention, what I claim as new and desire to secure by Letters Patent is:

1. A stanchion comprising a pair of horizontal beams spaced from each other and having alined holes extending therethrough, having relatively long eyebolts extending through said holes and rotatable and slidable therein, the eye heads of said bolts projecting from opposed faces of said beams, nuts on said bolt shanks for limiting the movement of the eye heads toward each other, a pair of chain lengths connected to said eye heads for encompassing the neck of an animal, and the adjustment of said eyebolts toward or away from each other serving to vary the lateral spreading capacity of said chain lengths to suit the neck sizes of different animals.

2. The combination set forth in claim 1,— and one of said chain lengths having a snap hook which may be disengaged to admit the animal's neck between the lengths.

In testimony whereof I affix my signature.

HENRY W. McCANDLESS.